United States Patent
Kawaguchi et al.

(10) Patent No.: US 10,017,206 B2
(45) Date of Patent: Jul. 10, 2018

(54) APPARATUS FOR CONTROLLING STEERING OF INDUSTRIAL VEHICLE AND METHOD THEREFOR

(71) Applicant: KABUSHIKI KAISHA TOYOTA JIDOSHOKKI, Kariya-shi, Aichi-ken (JP)

(72) Inventors: Gouki Kawaguchi, Aichi-ken (JP); Norihiko Kato, Aichi-ken (JP); Hitoshi Fukuoka, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/257,323

(22) Filed: Sep. 6, 2016

(65) Prior Publication Data
US 2017/0072999 A1  Mar. 16, 2017

(30) Foreign Application Priority Data
Sep. 14, 2015  (JP) ................. 2015-180331

(51) Int. Cl.
| B62D 5/00 | (2006.01) |
| B62D 6/00 | (2006.01) |
| B62D 5/04 | (2006.01) |
| B62D 5/06 | (2006.01) |
| B66F 9/075 | (2006.01) |
| B62D 3/02 | (2006.01) |

(52) U.S. Cl.
CPC .............. *B62D 6/00* (2013.01); *B62D 5/001* (2013.01); *B62D 5/0457* (2013.01); *B66F 9/07568* (2013.01); *B62D 3/02* (2013.01); *B62D 5/06* (2013.01)

(58) Field of Classification Search
None
See application file for complete search history.

(56) References Cited

U.S. PATENT DOCUMENTS

| 4,986,387 A * | 1/1991 | Thompson | B62D 7/142 180/212 |
| 2004/0262071 A1* | 12/2004 | Duits | B62D 5/005 180/402 |

(Continued)

FOREIGN PATENT DOCUMENTS

JP  2000-344122 A  12/2000

*Primary Examiner* — Mussa A Shaawat
*Assistant Examiner* — Abdhesh K Jha
(74) *Attorney, Agent, or Firm* — Sughrue Mion, PLLC (57) ABSTRACT

An apparatus and a method for controlling steering of an industrial vehicle includes a wheel angle detector, a travel determining device, and a control calculation device that calculates a wheel angle average and a maximum variation of wheel angle in the specified period and learns a reference steering limit angle. The control calculation device determines that the steerable wheel is in a steering limit state if an actual traveling speed is maintained at the specified speed or higher for the specified period of time or longer, the average wheel angle in the specified period of time is at a specified angle or greater, and the maximum variation of wheel angle in the specified period of time is at a specified value or less. The control calculation device renews the reference steering limit angle if the steerable wheel is determined to be in the steering limit state.

8 Claims, 4 Drawing Sheets

(56) References Cited

U.S. PATENT DOCUMENTS

2012/0029771 A1* 2/2012 Mackin .............. A01D 41/1278
  701/41
2013/0054074 A1* 2/2013 Schreiber ............. B62D 5/0457
  701/23

* cited by examiner

APPARATUS FOR CONTROLLING STEERING OF INDUSTRIAL VEHICLE AND METHOD THEREFOR

BACKGROUND OF THE INVENTION

The present invention relates to an apparatus and a method for controlling the steering of an industrial vehicle and, more specifically, to an apparatus and a method for controlling the steering of a forklift truck with high precision.

Japanese Patent Application Publication 2000-344122 discloses a control apparatus and a method for controlling in a full electric manner the steering of an industrial vehicle such as a forklift truck through compensation for the detection errors of wheel angle of steerable wheels. When a turn-on of a start switch of the forklift truck is detected, the steerable wheel is turned automatically by a wheel angle changing means to either one of its steering limit positions and the turned angle of the wheel is detected by an angle detecting means, and then the steerable wheel is turned to the other steering limit position by the angle detecting means and the turned angle of the wheel is detected by the angle detecting means. The above-described steering control apparatus modifies the value of the wheel angle which is used as the reference in changing the wheel angle by the wheel angle changing means, based on the wheel angles of the steerable wheel at its steering limit positions.

In the above-described steering control apparatus, however, the industrial vehicle cannot be used for its intended purpose during the detection of the wheel angle at the steering limit positions. In the case of a steering control apparatus in which the steering wheel and the steerable wheel are mechanically linked, the steering wheel is turned automatically without the manipulation by the operator, which may give the forklift operator an odd feeling. In addition, the detection of the wheel angle at the steering limit position is performed by the stationary steering, so that not only the wear of the tire is accelerated, but a force greater than the restoring force of the tire needs to be applied in the detection of the wheel angle at the steering limit position.

The present invention, which has been made in light of the problems mentioned above, is directed to providing an apparatus and a method for controlling the steering of an industrial vehicle that detects accurately the wheel angle at steering limit position without performing the stationary steering and is applicable to a mechanically linked steering control mechanism, as well as to a steer-by-wire steering control mechanism.

SUMMARY OF THE INVENTION

In accordance with an aspect of the present invention, there is provided an apparatus for controlling steering of an industrial vehicle including a wheel angle detector that is configured to detect a wheel angle of a steerable wheel and a travel determining device that is configured to determine whether or not the industrial vehicle travels at a specified speed or higher. The apparatus for controlling steering of the industrial vehicle further include a control calculation device that is configured to calculate an average wheel angle and a maximum variation of the wheel angle in a specified period of time and to learn a reference steering limit angle. The control calculation device determines that the steerable wheel is in a steering limit state if an actual traveling speed of the industrial vehicle is maintained at the specified speed or higher for the specified period of time or longer, the average wheel angle in the specified period of time is at a specified angle or greater, and the maximum variation of the wheel angle in the specified period of time is at a specified value or less. The control calculation device renews the reference steering limit angle if the steerable wheel is determined to be in the steering limit state. A method for controlling steering of an industrial vehicle includes the steps of detecting a wheel angle of a steerable wheel while the industrial vehicle travels at a specified speed or higher, calculating an average of the wheel angle and a maximum variation of the wheel angle in a specified period of time, determining that the steerable wheel is in a steering limit state if an actual traveling speed of the industrial vehicle is maintained at the specified speed or higher for the specified period of time or longer, the average wheel angle in the specified period of time is at a specified angle or greater, and the maximum variation of the wheel angle in the specified period of time is at a specified value or less, and renewing a reference steering limit angle if the steerable wheel is determined to be in the steering limit state.

DETAILED DESCRIPTION OF THE EMBODIMENTS

The following will describe an apparatus for controlling steering of a forklift truck that is equipped with a steer-by-wire steering mechanism according to a first embodiment of the present invention with reference to FIGS. 1 through 5.

Figure 1:
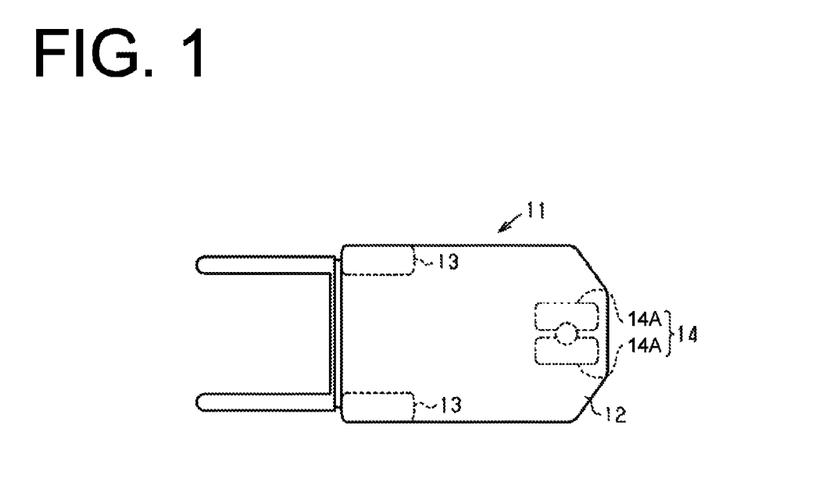
FIG. 1 is a schematic plan view of a forklift truck having an apparatus for controlling steering according to a first embodiment of the present invention, showing a relationship between a pair of front wheels and a rear steerable wheel unit.

Referring to FIG. 1, there is shown a counterbalanced forklift truck 11 including a vehicle body 12 that has at the front thereof a pair of front wheels 13 and at the rear thereof a steerable wheel unit 14. The steerable wheel unit 14 is formed by a double wheel including a pair of wheels 14A. The steerable wheel unit 14 is disposed at the widthwise center of the vehicle body 12. The steerable wheel unit 14 corresponds to the steerable wheel of the present invention.

Figure 2:
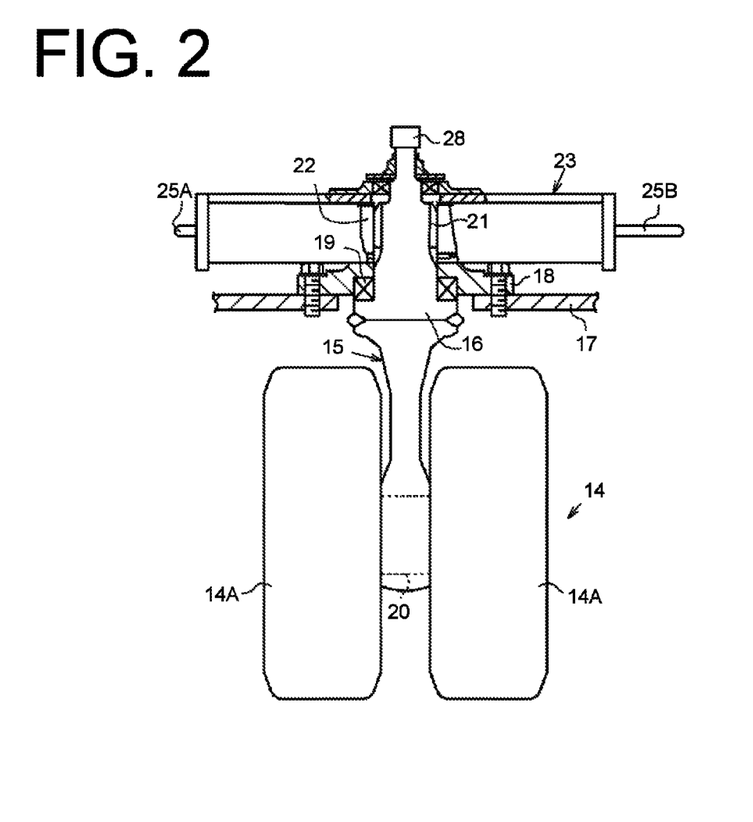
FIG. 2 is a cross-sectional fragmentary front view of the apparatus for controlling steering of the forklift truck of the FIG. 1, showing a supporting structure of the steerable wheel unit.

As shown in FIG. 2, the steerable wheel unit 14 is supported by a support member 15 that includes a mounting shaft 16 having the rotation axis thereof extending vertically to the vehicle body 12 and a shaft 20. The mounting shaft 16 is rotatably supported by a mounting bracket 18 fixed to a vehicle frame 17 via a bearing 19. The two wheels 14A are mounted on the opposite ends of the shaft 20 in the support member 15.

Referring to FIG. 2, there is shown a steering mechanism that steers the steerable wheel unit 14 includes a pinion 21 that is fixed on the mounting shaft 16 of the support member 15. The support member 15, the mounting shaft 16 and the pinion 21 are disposed coaxially with the axis that extends perpendicularly to a line extending along the axial center of and between the wheels 14A at the center thereof.

Figure 3:
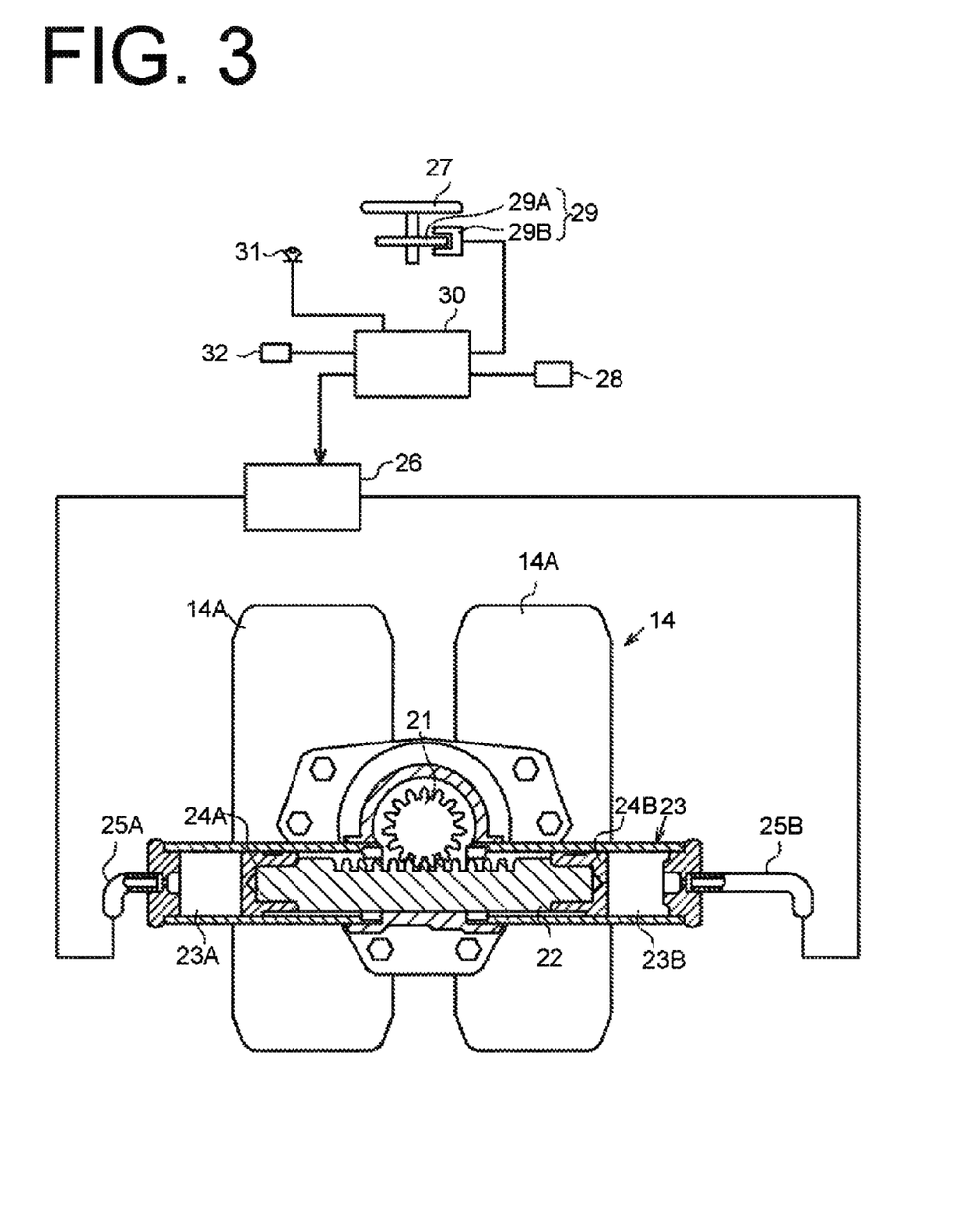
FIG. 3 is a partial cross-sectional schematic view of a steering mechanism of the apparatus for controlling steering.

As shown in FIG. 3, a rack 22 is housed in a steering cylinder 23 having therein two pistons 24A, 24B and is engaged with the pinion 21. The pistons 24A, 24B are fixed to the rack 22 at the opposite ends thereof for integral movement in the steering cylinder 23. The wall of the steering cylinder 23 on the side adjacent to the pinion 21 has an opening through which the pinion 21 engages with the rack 22 in the steering cylinder 23 and the steering cylinder 23 is mounted to the mounting bracket 18.

As shown in FIG. 3, the steering cylinder 23 has therein at the opposite ends thereof oil chambers 23A, 23B and two oil hoses 25A, 25B are connected at one ends thereof to the respective oil chambers 23A, 23B of the steering cylinder 23. The oil hoses 25A, 25B are connected at the other ends thereof to a solenoid valve 26 that controls the flow of hydraulic oil discharged from a hydraulic pump (not shown) and the direction in which the hydraulic oil is supplied. When solenoid valve 26 allows the hydraulic oil to be supplied to the oil chamber 23A through the oil hose 25A, the hydraulic oil in the oil chamber 23B is returned to an oil tank (not shown) through the oil hose 25B, and when the hydraulic oil is supplied to the oil chamber 23B though the oil hose 25B, the hydraulic oil in the oil chamber 23A is returned to oil tank through the oil hose 25A.

Referring to FIG. 3, there is shown a steering wheel 27, and the steerable wheel unit 14 is turned in either direction in conjunction with the rotation of the steering wheel 27. The steering mechanism of the steering control apparatus for the forklift truck 11 of the present embodiment has no mechanical linkage between the steerable wheel unit 14 and the steering wheel 27. In the steering mechanism of FIG. 3, the steerable wheel unit 14 is turned by the steering cylinder 23 that is driven by the oil pressure thereby to change the wheel angle. In the present embodiment, the wheel angle refers to an angle of steerable wheel with respect to an imaginary plane extending perpendicular to the shaft 20. The solenoid valve 26 allows hydraulic oil of a volume corresponding to the rotation amount of the steering wheel 27 to be supplied to the steering cylinder 23 through the oil hose 25A when the steering wheel 27 is rotated clockwise, and through the oil hose 25B when the steering wheel 27 is rotated counterclockwise, thereby turning the steerable wheel unit 14.

The support member 15 has a structure that prevents the steerable wheel unit 14 from being turned beyond their limit angle by contact with a restricting member (not shown) that is mounted to the vehicle body 12, so that the turning of the steerable wheel unit 14 in clockwise and counterclockwise directions is restricted at the respective steering limit angles. The angular position of the steerable wheel unit 14 fully turned in either direction to their extreme positions will be referred to as the steering limit position or steering limit angle.

According to the present embodiment, the positions of the steerable wheel unit 14 turned 90 degree in clockwise or counterclockwise direction from the straight-ahead position shown in FIG. 1 correspond to the respective steering limit positions. The support member 15 of the steerable wheel unit 14 has a potentiometer 28 that is mounted on the mounting shaft 16. The potentiometer 28 is configured to detect the rotated angle of the support member 15 of the steerable wheel unit 14 and hence the wheel angle of the steerable wheel unit 14. The potentiometer 28 corresponds to the wheel angle detector of the present invention.

An encoder 29 is fixedly mounted on the steering shaft for rotation therewith to detect the turned angle of the steering wheel 27. The encoder 29 includes a disk 29A having a plurality of slits formed in the circumferential direction thereof and a light detector 29B that includes a light projector and a light receiver, and the disk 29A is arranged in a manner in which the slits of the disk 29A are moved past and between the light projector and the light receiver of the light detector 29B. Either an incremental encoder or an absolute encoder may be used for the encoder 29.

The forklift truck 11 has a start switch 31 a vehicle speed sensor 32 and a controller 30. The controller 30 is electrically connected to the potentiometer 28 functioning as the wheel angle detector, the encoder 29, the start switch 31 and the vehicle speed sensor 32. The vehicle speed sensor 32 is configured to detect the travelling speed of the forklift truck 11 and to determine whether or not the forklift truck 11 travels at a specified speed or higher. The travel determining device of the present invention includes the vehicle speed sensor 32. The controller 30 is further electrically connected to and controls the solenoid valve 26 via a drive circuit (not shown).

The controller 30 includes a CPU and a memory (neither shown). The memory of the controller 30 stores therein a control program that drives the solenoid valve 26 so that the steerable wheel unit 14 is turned for an angle corresponding to the turned angle of the steering wheel 27 that is detected by the encoder 29. Additionally, the memory of the controller 30 has another control program that determines whether not the steerable wheel unit 14 is in a steering limit state, learns a reference steering limit angle and renews the reference steering limit angle if the steerable wheel unit 14 is determined to be in a steering limit state. The controller 30 corresponds to the control calculation device of the present invention.

The CPU determines that the steerable wheel unit 14 is in the steering limit state if an actual travelling speed of the forklift truck 11 is maintained at a specified speed or higher for a specified period of time or longer, the average wheel angle of the steerable wheel unit 14 in the specified period of time is at a specified angle or greater, and the maximum variation of the wheel angle of the steerable wheel unit 14 in the specified period of time is at or less than a specified value. The specified speed refers to an actual traveling speed of the forklift truck 11 that may be expressed in km/hr. Therefore, the steering limit position reached by the stationary steered steerable wheel unit 14 is not regarded as the steering limit state in the steering controlling apparatus and method according to the present invention. "Specified period of time" is set at duration of time that is long enough for the forklift truck 11 to make a 180 degree turn at the maximum travelling speed while the steerable wheel unit 14 is positioned at one steering limit angle. "Specified angle" is determined by various factors such as the mounting condition of the steerable wheel unit 14, the positional relationship between the steerable wheel unit 14 and the restricting member that restricts the movement of the steerable wheel unit 14, and the mounting position of the potentiometer 28. "Maximum variation" corresponds to one or less percent of the detectable range of the potentiometer 28.

The following will describe the operation of the above-described steering control apparatus.

When the steering wheel 27 is rotated in a desired traveling direction of the forklift truck 11, the steerable wheel unit 14 is turned accordingly so that forklift truck 11 travels in the desired direction. When the steering wheel 27 is rotated clockwise so as to turn the forklift truck 11, for example, to the right, hydraulic oil is supplied to the oil chamber 23A of the steering cylinder 22 through the solenoid valve 26 and the oil hose 25A thereby to force the piston 24A rightward in FIG. 3. Accordingly, the rack 22 is moved rightward in FIG. 3 and causes the piston 24B to force the hydraulic oil in the oil chamber 23B back to the oil tank (not shown) through the oil hose 25B and the solenoid valve 26. With the rightward movement of the rack 22, the pinion 21 that is engaged with the rack 22 is rotated counterclockwise. Accordingly, the support member 15 is turned counterclockwise via the mounting shaft 16 formed with the pinion 21 and causes the steerable wheel unit 14 to be turned counterclockwise about the mounting shaft 16. Thus, the forklift truck 11 is turned to the right.

Figure 4:
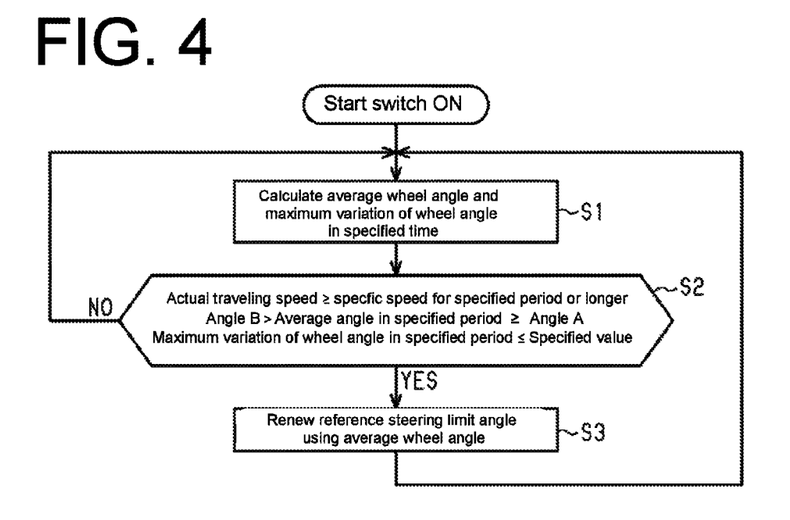
FIG. 4 is a flow chart showing a procedure for renewal of reference steering limit angle of the steerable wheel unit.

Referring to FIG. 4, there is shown a flow chart for the controller 30 to renew the reference steering limit angle. When the start switch 31 of the forklift truck 11 is turned on, the controller 30 renews the reference steering limit angle in accordance with the procedure of the flow chart shown in FIG. 4. Specifically, the controller 30 performs steps S1 through S3 of the procedure based on the signals from the potentiometer 28 and the vehicle speed sensor 32.

Firstly at step 1, the controller 30 calculates the average wheel angle in the specified period of time and the maximum variation of the wheel angle in the specified period of time. The specified period of time may be set at any suitable time as long as it is long enough for the forklift truck 11 to make a 180-degree turn with the steerable wheel unit 14 turned to the steering limit position.

At step S2, the controller 30 determines whether or not the steerable wheel unit 14 is in the steering limit state. The controller 30 determines that the steerable wheel unit 14 is in the steering limit state if three conditions (i.e. the actual travelling speed of the vehicle detected by the vehicle speed sensor being maintained at the specified speed or higher for the specific period or longer, the average wheel angle of the steerable wheel unit 14 in the specified period of time being at the lower limit specific angle A or greater and less than the specified upper limit angle B, the maximum variation of the wheel angle of the steerable wheel unit 14 for the specific period being at the specified angle or less) are all met.

If YES at step S2, the controller 30 proceeds to step S3 and renews the reference steering limit angle with the average wheel angle of the steerable wheel unit 14 determined at step S1. If NO at step S2, the controller returned to step S1 and start over. The method for controlling the steering in a forklift truck 11 is accomplished by performing steps S1, S2 and S3.

Figure 5A:
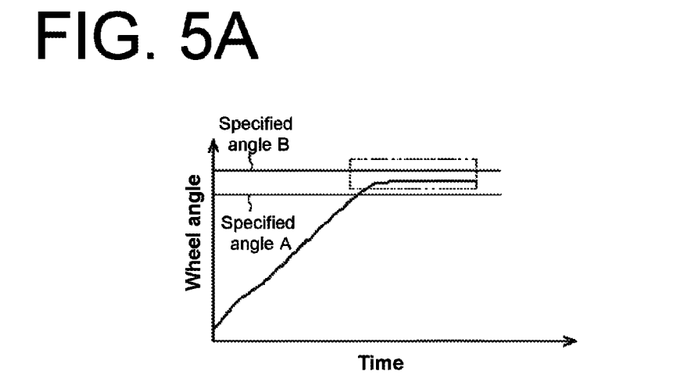
FIG. 5A is a chart showing detected angle of wheels varying with time.
Figure 5B:
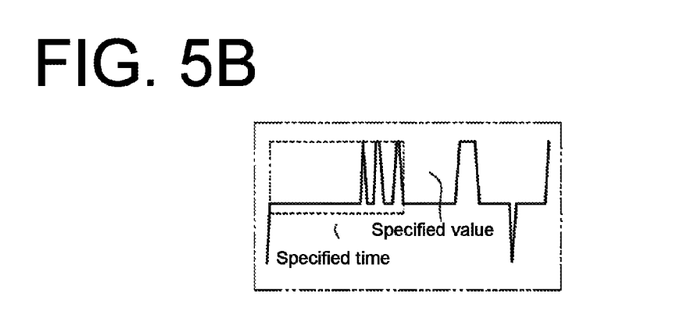
FIG. 5B is an enlarged view of a part enclosed by chain double-dashed line in FIG. 5A.

As shown in FIGS. 5A and 5B, the signal produced by the potentiometer 28 when the steerable wheel unit 14 is fully turned to its steering limit position does not remain constant, but fluctuates. Therefore, if it is not by stationary steering, or the detection signal for the steering limit position that is detected by the potentiometer 28 when the steerable wheel unit 14 is turned to its steering limit position while the forklift truck 11 is traveling does not necessarily represent the actual steering limit position and there exists an error between the detected steering limit position and the actual steering limit position. The above-described three conditions are set so as to determine the steering limit position of the steerable wheel unit 14 with as little error as possible. It is to be noted that part of the peaks of the detected wheel angles is not shown in the chart in FIG. 5B.

The first condition is whether or not the actual speed of the vehicle is maintained at the specific speed or higher for the specific period or longer, which ensures that the detection signal from the potentiometer 28 representing the steering limit position is produced when the steerable wheel unit 14 is turned to the steering limit position while the forklift truck 11 is traveling (no stationary steering). One of the second conditions that requires the average wheel angle of the steerable wheel unit 14 for the specified period of time to be at the specific angle A or greater is set as the lower limit of the angle variation that may be caused by the mounting condition of the steerable wheel unit 14, the positional relation between the steerable wheel unit 14 and the restricting member, and the mounting position of the potentiometer 28. This condition ensures that the wheel angle of the steerable wheel unit 14 at the steering limit position is detected effectively. The other of the second conditions that requires the average wheel angle of the steerable wheel unit 14 for the specified period of time to be less than the specified upper limit angle B is set to prevent the renewal of the reference steering limit angle when the average wheel angle of the steerable wheel unit 14 is increased erroneously due to a detection error.

Furthermore, the third condition that requires the maximum variation of the wheel angle in the specified period of time to be at the specific value or less prevents the renewal of the reference steering limit angle by wrong value of the average wheel angle when the value of the wheel angle is varied excessively by any causes.

The present embodiment according to the present invention offers following effects.

(1) The steering control apparatus includes the potentiometer 28 (wheel angle detector) that detects the wheel angle of the steerable wheel unit 14, the vehicle speed sensor 32 (travel determining device) that determines whether or not the forklift truck 11 is traveling at the specified speed or higher, and the controller 30 that calculates the average wheel angle and the maximum variation of the wheel angle of the steerable wheel unit 14 for the specific period of time. The controller 30 (control calculation device) determines that the steerable wheel unit 14 is in the steering limit state and renews the reference steering limit angle if the actual speed of the forklift truck 11 detected by the vehicle speed sensor 32 is maintained at the specified speed or higher for the specified period of time or longer, the average wheel angle of the steerable wheel unit 14 in the specified period of time is at the lower limit angle A or greater and less than the upper limit angle B, and the maximum variation of the wheel angle of the steerable wheel unit 14 for the specified period of time is at the specified value or less.

According to this configuration, when the steering limit angle of the steerable wheel unit 14 is detected by the wheel angle detector while the forklift truck 11 is travelling at the specified speed or higher, the renewal of the reference steering limit angle is made. Accurate detection of the steering limit position while the vehicle is travelling may be achieved and this method of steering control is applicable not only to the steer-by-wire steering mechanism, but to the mechanically linked steering mechanism.

According to the first embodiment, as a condition for the determination of the steering limit position of the steerable wheel unit 14, the average wheel angle of the steerable wheel unit 14 in the specified period of time needs to be less than the upper limit angle B that is set greater than the limit angle A, as well as at the specific angle A or greater. Without the condition requiring the average wheel angle to be less than upper limit angle B, there is a fear that the reference steering limit angle may be renewed by wrong value of the average wheel angle caused by erroneous detection of excessively high wheel angle. According to the present embodiment, however, such renewal of the reference steering limit angle based on erroneous detection of wheel angle may be prevented by determining whether or not the average wheel angle of the steerable wheel unit 14 for the specified period of time is at the specific angle A or greater and less than the upper limit specific angle B.

(2) The forklift truck 11 of the embodiment is a three-wheeled vehicle having at the front thereof a pair of front wheels 13 and at the rear thereof the steerable wheel unit 14 including a pair of wheels 14A. The three-wheeled vehicle is used with more frequent turning in a small radius, so that the wheels 14A of the steerable wheel unit 14 are more frequently turned to the steering limit positions, as compared with a four-wheeled vehicle. Despite that there may be errors in the detection of the wheel angle because of the deterioration of measuring accuracy of the potentiometer 28 (wheel angle detector) with time and the mounting position (the mounting condition), the reference steering limit angle is more frequently renewed by the detected wheel angle of the steerable wheel unit 14 in the steering limit state, with the result that accurate data of reference steering limit angle may be used in the steering control. In addition, the use of double wheels for the steerable wheel unit 14 is more advantageous in the stability of the vehicle than that of a single steerable wheel.

(3) The reference steering limit angle is set by the average wheel angle. Although, for example, the maximum wheel angle position or the wheel angle position at which the determination of whether the steerable wheel unit 14 is in the steering limit state may be used for the reference steering limit angle, the average of the wheel angles that are detected by the potentiometer 28 in the specified period of time is more accurate.

(4) In the above-described embodiment, the vehicle speed sensor 32 functioning as the travel determining device is used to determine whether or not the forklift truck 11 is traveling at the specified speed or higher. The use of the vehicle speed sensor 32 as the travel determining device is advantageous because no additional sensor to determine whether or not the forklift truck 11 is traveling at the specified speed or higher is needed.

(5) In the steering control method of the present embodiment, the wheel angle of the steerable wheel unit 14 is detected by the potentiometer 28 while the forklift truck 11 is travelling at the specified speed or higher, and the average wheel angle and the maximum variation of the wheel angle in the specified period of time are figured out. Subsequently, the controller 30 determines that the steerable wheel unit 14 is in the steering limit state if the actual travelling speed of the vehicle detected by the vehicle speed sensor 32 is maintained at the specified speed or higher for the specific period or longer, the average wheel angle of the steerable wheel unit 14 in the specified period of time is at the specified angle A or greater, and the maximum variation of the wheel angle of the steerable wheel unit 14 for the specified period of time is at or less than the specified value and renews the reference steering limit angle. Therefore, the steering control method is applicable not only to a steer-by-wire steering mechanism but also to a mechanically linked steering mechanism and permits accurate detection of the wheel angle of the steerable wheel at the steering limit position even while it is not by stationary steering.

Figure 6:
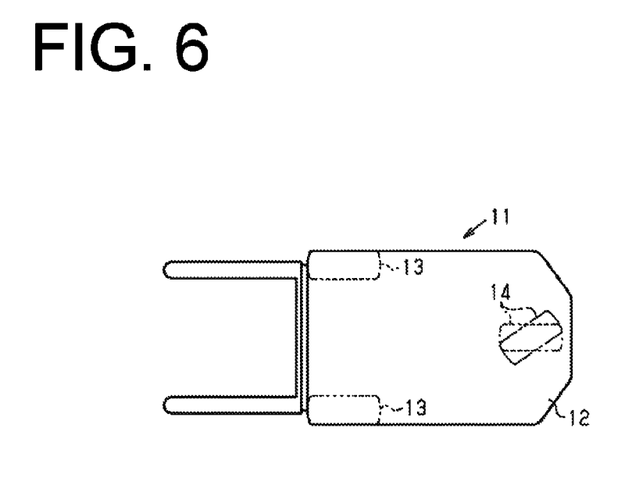
FIG. 6 is a schematic plan view of a forklift truck having an apparatus for controlling steering according to a second embodiment of the present invention, showing a pair of front wheels and a single steerable rear wheel according to a second embodiment of the present.
Figure 7:
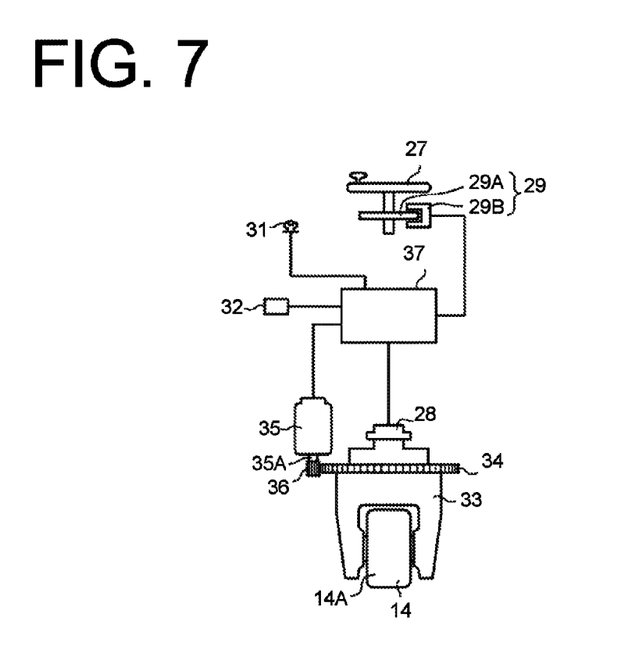
FIG. 7 is a schematic view of a steering mechanism of the steering control apparatus of FIG. 6.

The following will describe a second embodiment of the present invention with reference to FIGS. 6 and 7. The forklift truck 11 of the second embodiment differs in that a single steerable wheel unit 14 is used instead of the steerable wheel unit 14 including a pair of wheels 14A and also that an electrically-operated steering mechanism is used instead of a hydraulically-operated mechanism to change the wheel angle of the steerable wheel unit 14. Specifically, the electrically-operated steering mechanism includes an actuator or an electric motor.

Although the wheel angle of the steerable wheel unit 14 is changed by the electric motor in the second embodiment, the steering control method is generally the same as in the first embodiment. For the sake of the description, like or same parts or elements of the second embodiment will be designated by the same reference numerals used in the description of the first embodiment and the description thereof will not be reiterated.

Referring to FIG. 6, the forklift truck 11 of the second embodiment includes a vehicle body 12 having at the front thereof a pair of front wheels 13 and at the rear thereof a single wheeled steerable wheel unit 14 that is located at the widthwise center of the vehicle body 12.

Referring to FIG. 7, the steerable wheel unit 14 is turned by the rotation of the steering wheel 27. The steering control apparatus of the second embodiment has no mechanical linkage between the steerable wheel unit 14 and the steering wheel 27, but has the electric steering mechanism equipped with the actuator (electric motor) for changing the angle of the steerable wheel unit 14. The steering wheel 27 has on the outer periphery thereof a steering knob.

As shown in FIG. 7, the steering control apparatus includes a support member 33 that has an axis of rotation extending vertically to the vehicle body 12 and rotatably supports the steerable wheel unit 14. The support member 33 has on the top thereof a gear wheel 34. The gear wheel 34 is meshed with a gear 36 that is mounted on an output shaft 35A of an electric motor 35. The electric motor 35 functions as the wheel angle changer for the steerable wheel unit 14.

In addition, the support member 33 has a structure that prevents the steerable wheel unit 14 from being turned beyond specific steering limit angle in either of the clockwise and counterclockwise directions by contact with a restricting member (not shown) provided in the vehicle body 12. The potentiometer 28 functioning as the wheel angle detector is mounted on the rotatable shaft of the support member 33 supporting the steerable wheel unit 14.

The potentiometer 28 is electrically connected to the controller 37. Similarly, the encoder 29, the start switch 31 of the forklift truck 11 and the vehicle speed sensor 32 are also connected to the controller 37. The controller 37 is also connected to the electric motor 35 via an electric circuit (not shown) so that the electric motor 35 is controlled by the controller 37. The controller 37 corresponds to the control calculation device of the present invention.

The controller 37 include a CPU and a memory (neither shown), and the memory stores therein a control program that drives the electric motor 35 so that the steerable wheel unit 14 is turned to an angle corresponding to the turned angle of the steering wheel 27 that is detected by the encoder 29. The controller 37 has another control program stored in the memory that is configured to determine whether or not the steerable wheel unit 14 is in the steering limit state and to learn and renew the reference steering limit angle if the steerable wheel unit 14 is determined to be in the steering limit state.

The apparatus for controlling steering of the second embodiment uses the electrically-operated steering mechanism for the turning of the steerable wheel unit 14 instead of the hydraulically-operated mechanism in the first embodiment, but the determination of the steering limit position and the renewal of the reference steering limit angle when the steerable wheel unit 14 is turned to the steering limit position are performed in accordance with the same flow chart as in the first embodiment shown in FIG. 4.

The second embodiment offers substantially the same effects as those effects described under the items (1), (2), (4) and (5) of the first embodiment.

The embodiment of the present invention may be modified in various manners as exemplified below.

The maximum wheel angle or the wheel angle detected in the determination of the steering limit position may be used for the reference steering limit angle.

The second conditions for the determining of the steering limit state of the steerable wheel unit 14 may be modified in such a way that the average wheel angle of the steerable wheel unit 14 in the specified period need only be at the lower limit angle A or greater and the condition associated with the upper limit angle B is removed from the second conditions.

The steering mechanism need not necessarily be of a steer-by-wire system but may be of a mechanical linked system in which the steering wheel 27 is mechanically linked with the steerable wheel unit 14.

In the case that the mechanical linked system is used for the steering mechanism, the wheel angle may be estimated from the steering wheel angle.

The vehicle speed sensor 32 need not be used as the travel determining device as long as it can determine whether or not the vehicle such as the forklift truck 11 is travelling at a specified speed or higher. For example, in the case of a vehicle that is driven to travel by a motor, a sensor that detects the rotation of the motor may be used as the travel determining device.

The travel determining device may include a detection object part that is provided for rotation with the wheel of the vehicle and a sensor that detects the rotation of the object part. In such configuration, the object part may be mounted on an axle of the wheel and the sensor that detects the rotation of the object part is disposed facing the object part. In this case, when the travel determining device detects the object part repeatedly for the specified period, the vehicle is determined to be travelling at the specified speed or higher.

A potentiometer may be used instead of the encoder 29 as a steering wheel angle detector.

The forklift truck 11 need not be of a counterbalanced type but a reach type forklift truck.

The use of the apparatus and method for controlling steering of the present invention is not limited to the forklift truck, but the apparatus and method may be applied to other industrial vehicles.

The present invention is applicable to a four-wheeled vehicle having two steerable wheels.

What is claimed is:

1. An apparatus for controlling steering of an industrial vehicle, comprising:
    a wheel angle detector configured to detect a wheel angle of a steerable wheel;
    a travel determining device configured to determine whether or not the industrial vehicle travels at a specified speed or higher; and
    a control calculation device configured to calculate an average wheel angle and a maximum variation of the wheel angle in a specified period of time and to learn a reference steering limit angle, wherein the control calculation device determines that the steerable wheel is in a steering limit state if an actual traveling speed of the industrial vehicle is maintained at the specified speed or higher for the specified period of time or longer, the average wheel angle in the specified period of time is at a specified angle or greater, and the maximum variation of the wheel angle in the specified period of time is at a specified value or less, and wherein the control calculation device renews the reference steering limit angle if the steerable wheel is determined to be in the steering limit state.

2. The apparatus for controlling steering of the industrial vehicle according to claim 1, wherein as a condition for the determination of the control calculation device, the average wheel angle in the specified period of time is less than an upper limit angle that is greater than the specified angle.

3. The apparatus for controlling steering of the industrial vehicle according to claim 1, wherein the industrial vehicle is a three-wheeled vehicle including a pair of front wheels at the front thereof and the steerable wheel at the rear thereof, wherein the steerable wheel is a double wheel.

4. The apparatus for controlling steering of the industrial vehicle according to claim 1, wherein the industrial vehicle is a three-wheeled vehicle including a pair of front wheels at the front thereof and the steerable wheel at the rear thereof, and wherein the steerable wheel is a single wheel.

5. The apparatus for controlling steering of the industrial vehicle according to claim 1, wherein the reference wheel limit angle is the average wheel angle.

6. The apparatus for controlling steering of the industrial vehicle according to claim 1, wherein the travel determining device is a vehicle speed sensor.

7. A method for controlling steering of an industrial vehicle, comprising the steps of:
    detecting a wheel angle of a steerable wheel while the industrial vehicle travels at a specified speed or higher;
    calculating an average wheel angle and a maximum variation of the wheel angle in a specified period of time;
    determining that the steerable wheel is in a steering limit state when an actual traveling speed of the industrial vehicle is maintained at the specified speed or higher for the specified period of time or longer, the average wheel angle in the specified period of time is at a specified angle or greater, and the maximum variation of the wheel angle in the specified period of time is at a specified value or less;
    determining that the steering wheel is not in the steering limit state when the actual traveling speed of the industrial vehicle is not maintained at the specified speed or higher for the specified period of time or longer, or the average wheel angle in the specified period of time is not at the specified angle or greater, or the maximum variation of the wheel angle in the specified period of time is not at the specified value or less;
    renewing a reference steering limit angle when the steerable wheel is determined to be in the steering limit state; and returning to the calculating step without renewing the reference steering limit angle when the steering wheel is not determined to be in the steering limit state.

8. The method for controlling steering of the industrial vehicle according to claim 7, wherein the reference steering limit angle is the average wheel angle.

* * * * *